(12) United States Patent
Katano

(10) Patent No.: US 8,654,453 B2
(45) Date of Patent: Feb. 18, 2014

(54) IMAGE PICKUP APPARATUS

(75) Inventor: Kenichi Katano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/535,493

(22) Filed: Aug. 4, 2009

(65) Prior Publication Data
US 2010/0033844 A1 Feb. 11, 2010

(30) Foreign Application Priority Data

Aug. 6, 2008 (JP) ................................. 2008-203183

(51) Int. Cl.
*G02B 7/10* (2006.01)
*G02B 7/02* (2006.01)
(52) U.S. Cl.
CPC . *G02B 7/10* (2013.01); *G02B 7/022* (2013.01)
USPC .......................................... 359/700; 359/701
(58) Field of Classification Search
CPC .................................. G02B 7/10; G02B 7/022
USPC .................................................. 359/699–701
See application file for complete search history.

(56) References Cited

U.S. PATENT DOCUMENTS

| 5,870,232 A | * | 2/1999 | Tsuji et al. | ..................... 359/700 |
| 6,115,190 A | | 9/2000 | Hirai | |
| 6,954,587 B2 | * | 10/2005 | Tanaka | .......................... 359/700 |
| 7,046,456 B2 | * | 5/2006 | Tsuji | ............................. 359/699 |

FOREIGN PATENT DOCUMENTS

| CN | 1296767 C | 1/2007 |
| JP | 09-211290 A | 8/1997 |
| JP | 2000-111786 | 4/2000 |
| JP | 2003-021776 A | 1/2003 |
| JP | 2005-173412 A | 6/2005 |

* cited by examiner

*Primary Examiner* — Zachary Wilkes
(74) *Attorney, Agent, or Firm* — Cowan, Liebowitz & Latman, P.C.

(57) ABSTRACT

An image pickup apparatus which makes it possible to form a multi-stage retractable lens barrel permitting the amount of extension of the lens barrel to be set as desired. A first intermediate rotary barrel fitted, for rotation, on a first intermediate rectilinear motion barrel restrained from rotation about an optical axis. A second intermediate rectilinear motion barrel is rectilinearly guided by the first intermediate rectilinear motion barrel. A second intermediate rotary barrel is fitted on the second intermediate rectilinear motion barrel and engaged with the first intermediate rotary barrel, rotation. The first intermediate rectilinear motion barrel has a cam groove formed on an inner peripheral surface thereof, for engagement with the second intermediate rotary barrel to cause the same to move along the optical axis.

6 Claims, 17 Drawing Sheets

IMAGE PICKUP APPARATUS

BACKGROUND OF THE INVENTION

1. Field of the Invention

The present invention relates to an image pickup apparatus, and more particularly to an image pickup apparatus characterized by its zoom mechanism.

2. Description of the Related Art

Conventionally, there have been proposed various techniques concerning a zoom lens barrel which is extended from the body of an image pickup apparatus for shooting and retracted into the apparatus body for accommodation. This type of zoom lens barrel is formed by combining a plurality of rectilinear motion barrels and rotary barrels, and is configured to be advanced and retracted along an optical axis direction.

By combining a plurality of barrels, it is possible to form a lens barrel having a long total length. Further, it is possible to accommodate these barrels in the apparatus body when not in use to thereby reduce the thickness of the image pickup apparatus.

There has been proposed in Japanese Patent Laid-Open Publication No. 2000-111786 a multi-stage lens barrel mechanism comprised of a plurality of intermediate barrels each formed by combining a single rotary barrel and a single rectilinear motion barrel.

In the lens barrel mechanism disclosed in Japanese Patent Laid-Open Publication No. 2000-111786, the multi-stage structure thereof is formed by arranging a plurality of parts each formed by combining a single rotary barrel and a single rectilinear motion barrel. In this construction, the rotational force of each rotary barrel is obtained by converting the motion of the barrel along the optical axis direction into rotation by a cam.

For example, in a U-turn optical system wherein a lens is temporarily moved toward an image forming side in a process of zooming from the wide-angle end to the telephoto end, the direction of travel of the rotary barrel along the optical axis is changed during the zooming, and hence there is a moment when the amount of motion of the barrel becomes zero.

At this moment, in the lens barrel mechanism, where the motion of the barrel along the optical axis is converted into rotation by the cam, no rotational force is generated in each intermediate barrel.

Further, in a conventional lens barrel mechanism using helicoids, when a multi-stage restract mechanism is employed that is formed by combining helicoids arranged in the direction of extension of the lens barrel in a uniformly angled state, it is difficult to change the direction of travel of the intermediate barrels along the optical axis during zooming.

SUMMARY OF THE INVENTION

The present invention provides an image pickup apparatus which makes it possible to form a multi-stage retractable lens barrel permitting the amount of extension of the lens barrel to be set as desired.

In a first aspect of the present invention, there is provided an image pickup apparatus comprising a first rectilinear motion barrel configured to be restrained from rotation about an optical axis, a first rotary barrel configured to be fitted on the first rectilinear motion barrel, for rotation, a second rectilinear motion barrel configured to be rectilinearly guided by the first rectilinear motion barrel, and a second rotary barrel configured to be engaged with the first rotary barrel, and be fitted on the second rectilinear motion barrel, for rotation, wherein the first rectilinear motion barrel has a cam groove formed on an inner peripheral surface thereof, the cam groove being engaged with the second rotary barrel for causing the second rotary barrel to move along the optical axis.

In a second aspect of the present invention, there is provided an image pickup apparatus comprising a fixed barrel, a movable rectilinear motion barrel configured be rectilinearly guided by the fixed barrel and be movable along the optical axis, and a movable rotary barrel configured to be fitted on the movable rectilinear motion barrel and be movable along the optical axis, wherein the movable rectilinear motion barrel has a straight advance groove, a cam groove, and a through groove formed on an inner peripheral surface thereof, the straight advance groove rectilinearly guiding a rectilinearly moving member disposed radially inward of the movable rectilinear motion barrel, the cam groove causing a rotary member disposed radially inward of the movable rectilinear motion barrel to move along the optical axis by engagement with the rotary member, and the through groove being substantially identical in longitudinal shape to the cam groove, and wherein the movable rotary barrel has a straight advance groove formed on an inner peripheral surface thereof, the straight advance groove being engaged with an engagement portion of the rotary member disposed radially inward of the movable rotary barrel.

In a third aspect of the present invention, there is provided an image pickup apparatus comprising a cam barrel having a cam for controlling motion along an optical axis of a lens group movable along the optical axis, a movable rectilinear motion barrel configured to be rectilinearly guided and be movable along the optical axis, and a movable rotary barrel configured to be fitted on the movable rectilinear motion barrel, and be movable along the optical axis and, wherein the movable rectilinear motion barrel has a straight advance groove, a cam groove, and a through groove formed on an inner peripheral surface thereof, the straight advance groove rectilinearly guiding a rectilinearly moving member disposed radially inward of the movable rectilinear motion barrel, the cam groove being engaged with the cam barrel disposed radially inward of the movable rectilinear motion barrel, for causing the cam barrel to move along the optical axis, and the through groove being substantially identical in track to the cam groove, and wherein the movable rotary barrel has a straight advance groove formed on an inner peripheral surface thereof, the straight advance groove being engaged with a drive pin of the cam barrel disposed radially inward of the movable rotary barrel.

According to the image pickup apparatus of the present invention, it is possible to form a multi-stage retractable lens barrel that permits the amount of extension of the lens barrel to be set as desired.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
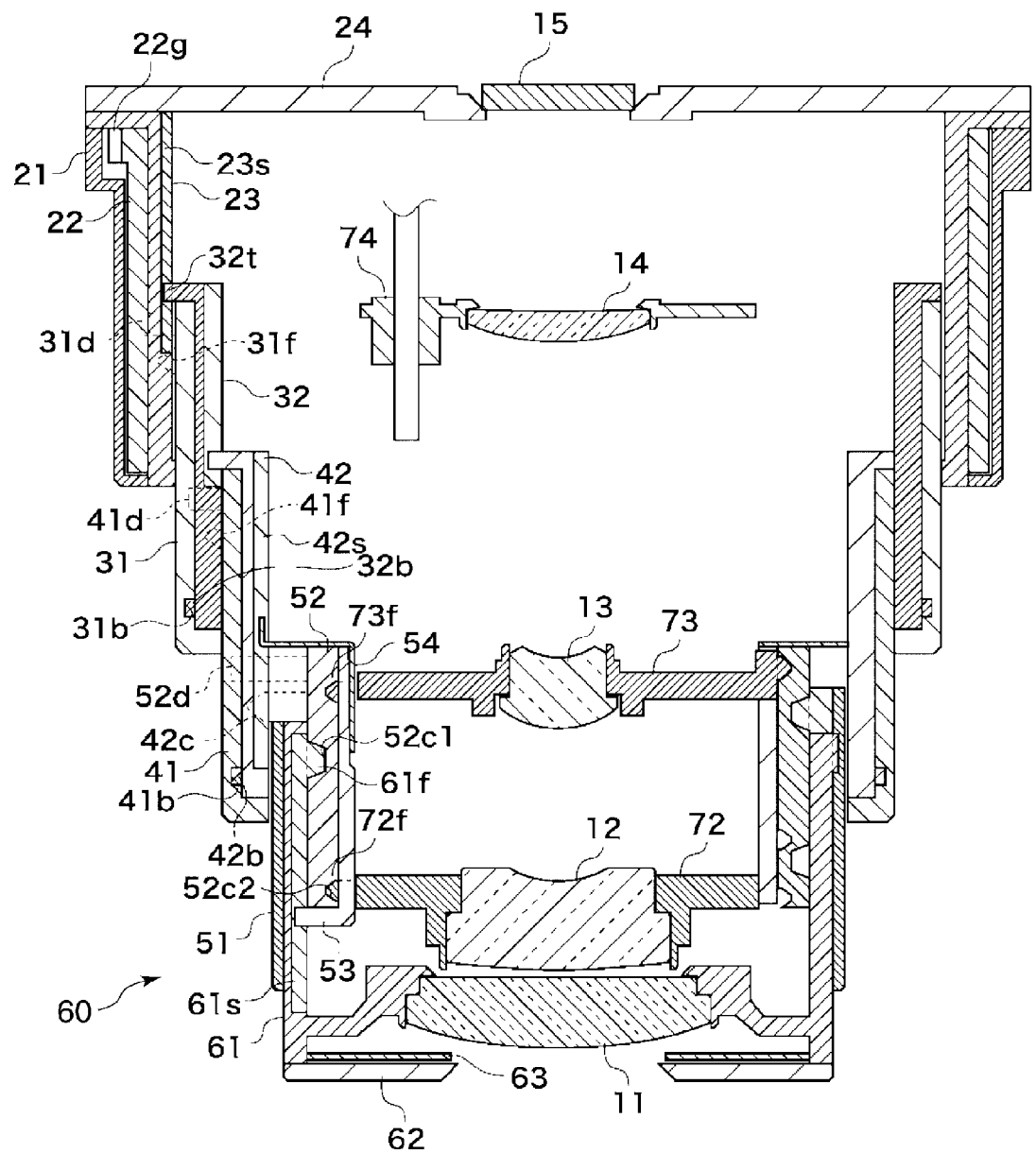
FIG. 1 is a view of a lens barrel of an image pickup apparatus according to a first embodiment of the present invention, which is in a wide-angle state when the image pickup apparatus is in a shooting mode.
Figure 2:
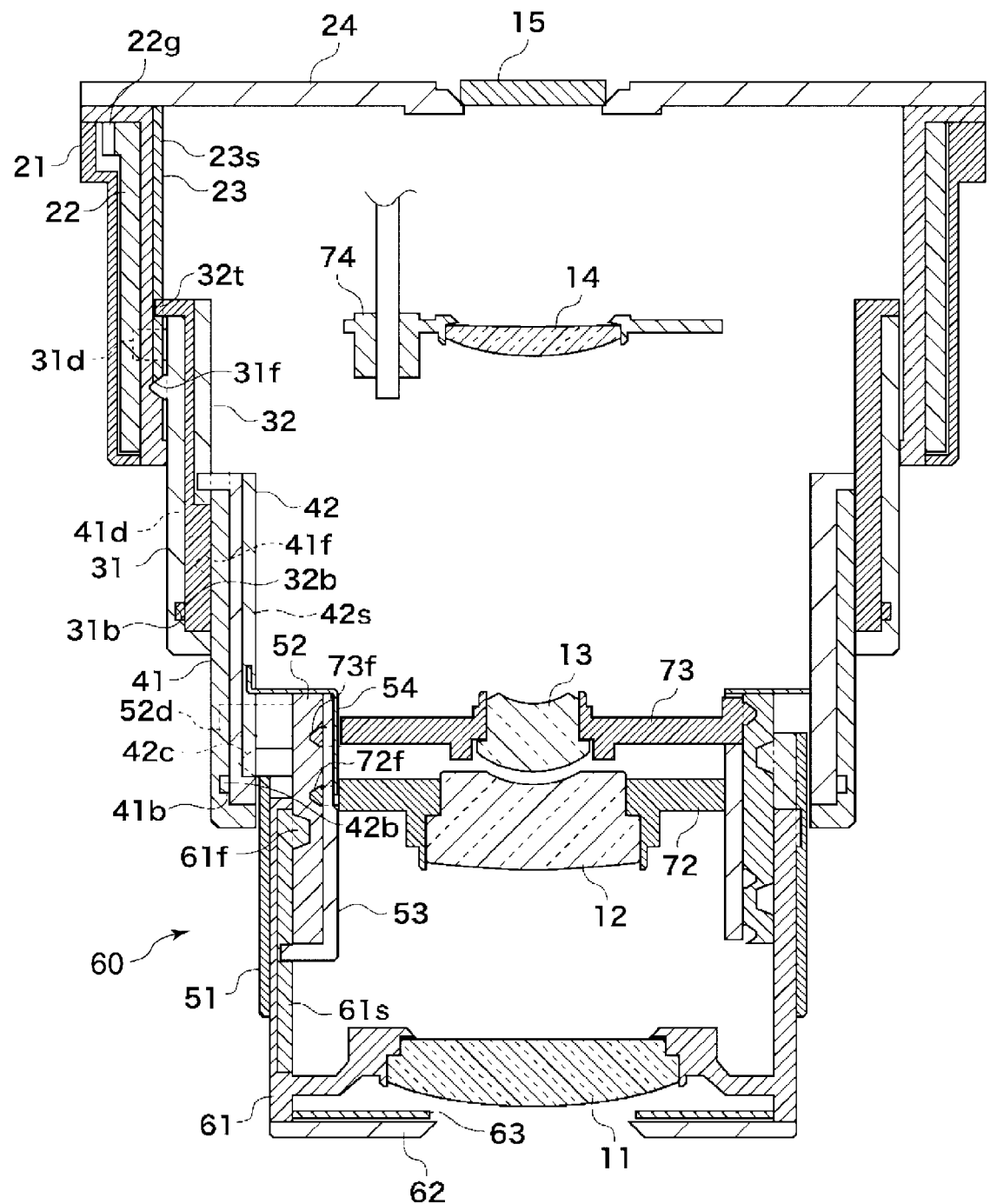
FIG. 2 is a view of the lens barrel of in the telephoto state when the image pickup apparatus is in the shooting mode.
Figure 3:
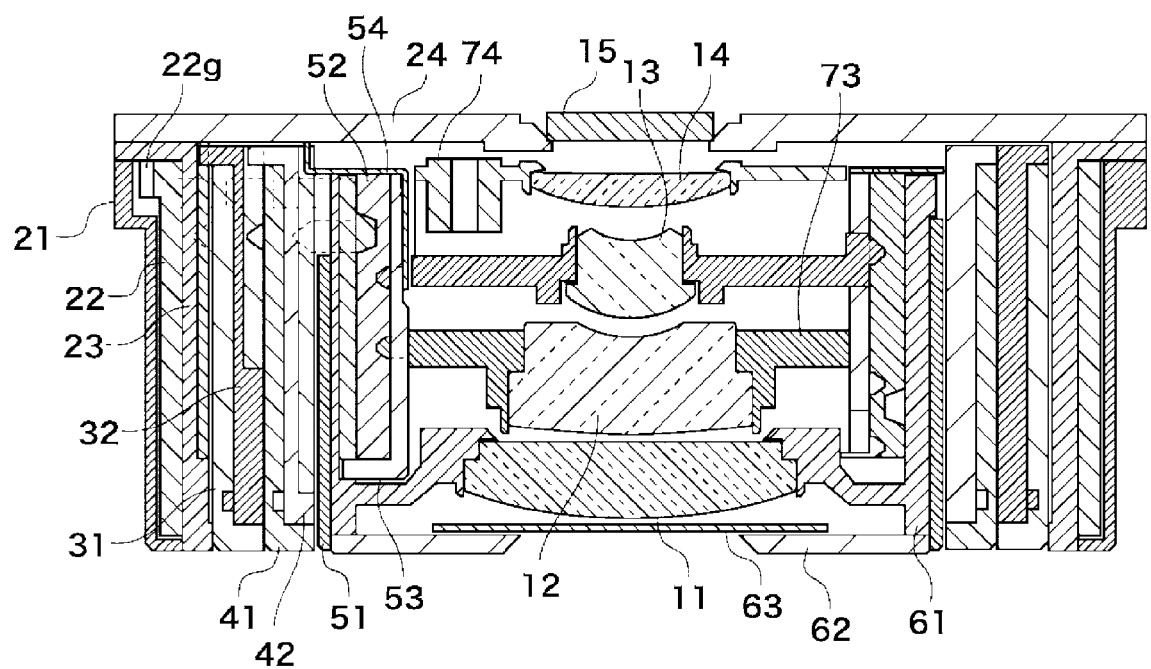
FIG. 3 is a view of the lens barrel in a restracted state.
Figure 4:
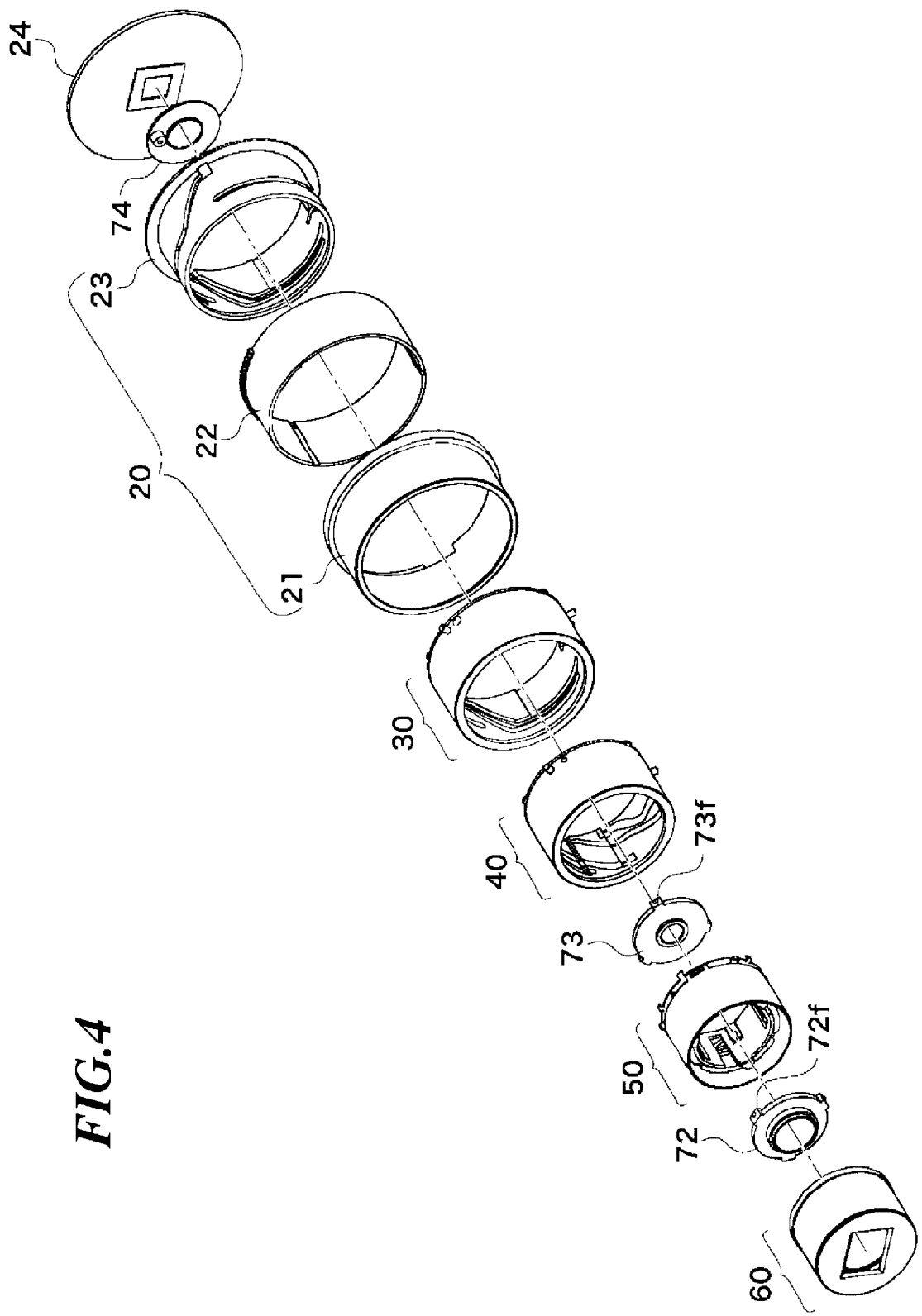
FIG. 4 is an exploded perspective view of the lens barrel.
Figure 5:
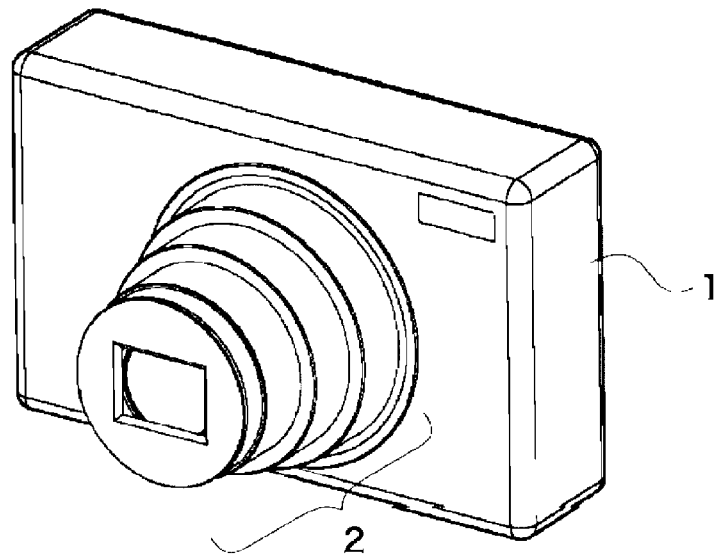
FIG. 5 is a perspective view of the image pickup apparatus.

FIG. 1 is a view of a lens barrel of an image pickup apparatus according to a first embodiment of the present invention, which is in the wide-angle state when in the shooting mode. FIG. 2 is a view of the lens barrel in the telephoto state when the image pickup apparatus is in the shooting mode. FIG. 3 is a view of the lens barrel in a restracted state. FIG. 4 is an exploded perspective view of the lens barrel. FIG. 5 is a perspective view of the image pickup apparatus.

As shown in FIG. 5, the present image pickup apparatus (camera) has a lens barrel (barrel unit) 2 mounted to a camera body 1.

As shown in FIGS. 1 to 3, the lens barrel in the present embodiment is comprised of four photographic lens groups. A first group lens 11 is held by a first group barrel 61, a second group lens 12 by a second group holder 72, and a third group lens 13 by a third group holder 73. Further, a fourth group lens 14 is held by a fourth group holder 74. The fourth group lens 14 is configured such that it is movable along an optical axis by receiving a driving force from a drive source, not shown.

The lens barrel has a four-stage structure, and is capable of changing its entire barrel length between a shooting state and a restracted state.

Now, a description will be given of each stage of the lens barrel.

A fixed barrel unit 20 is comprised of an outer barrel cover 21, and a rotary barrel 22 and a fixed barrel 23 disposed radially inward of the outer barrel cover 21. The barrel cover 21 is secured to the camera body 1 e.g. with screws and held thereby, together with the fixed barrel 23 and a holder 24 for holding an image pickup element 15.

Figure 6:
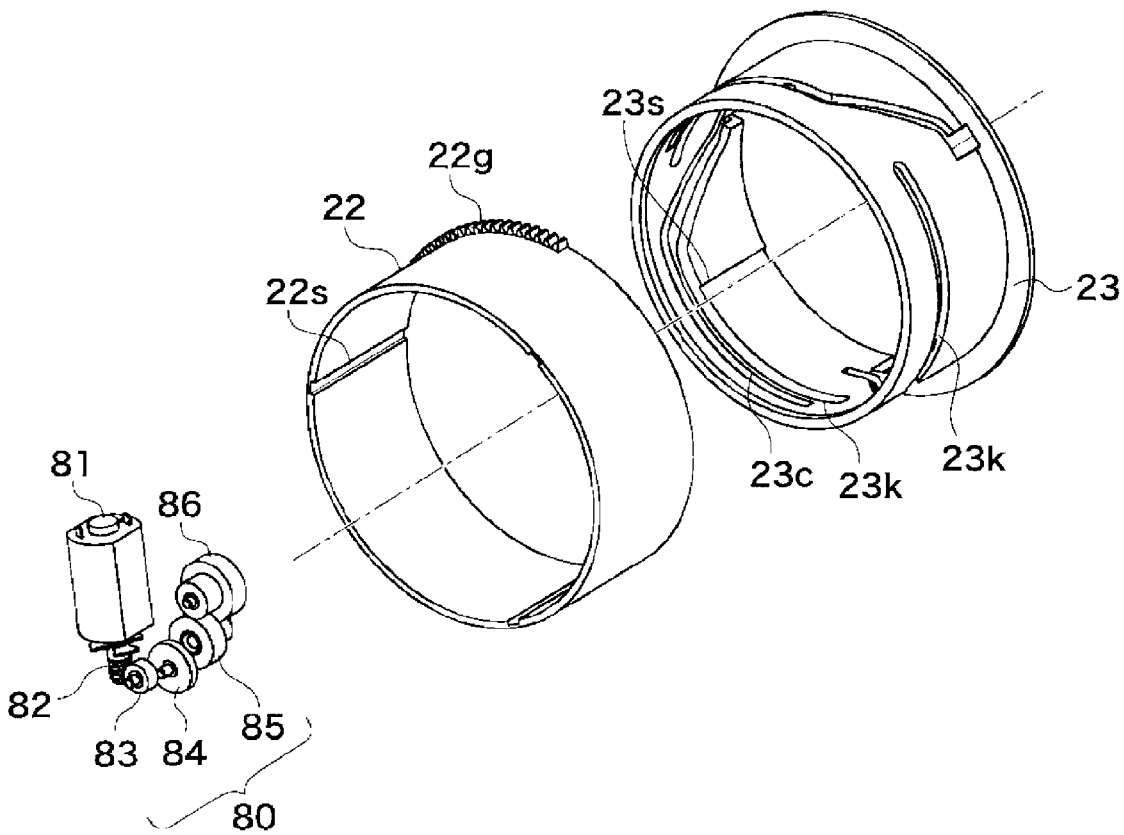
FIG. 6 is an exploded perspective view showing a rotary barrel and a fixed barrel of the lens barrel shown in FIG. 4.

FIG. 6 is an exploded perspective view showing the rotary barrel and the fixed barrel of the lens barrel shown in FIG. 4.

The barrel cover 21 holds a zoom gear unit 80 appearing in FIG. 6. The zoom gear unit 80 is comprised of a motor 81 as a drive source and gears 82 to 86 for transmitting a driving source from the motor 81.

The gear 86 is in meshing engagement with a gear 22g of the rotary barrel 22, and the rotary barrel 22 rotates about the optical axis circumferentially along the outer peripheral surface of the fixed barrel 23. The fixed barrel 23 has an inner peripheral surface thereof formed thereon with straight advance grooves 23s, through grooves 23k, and cam grooves 23c. The rotary barrel 22 has an inner peripheral surface thereof formed thereon with straight advance grooves 22s.

Figure 7:
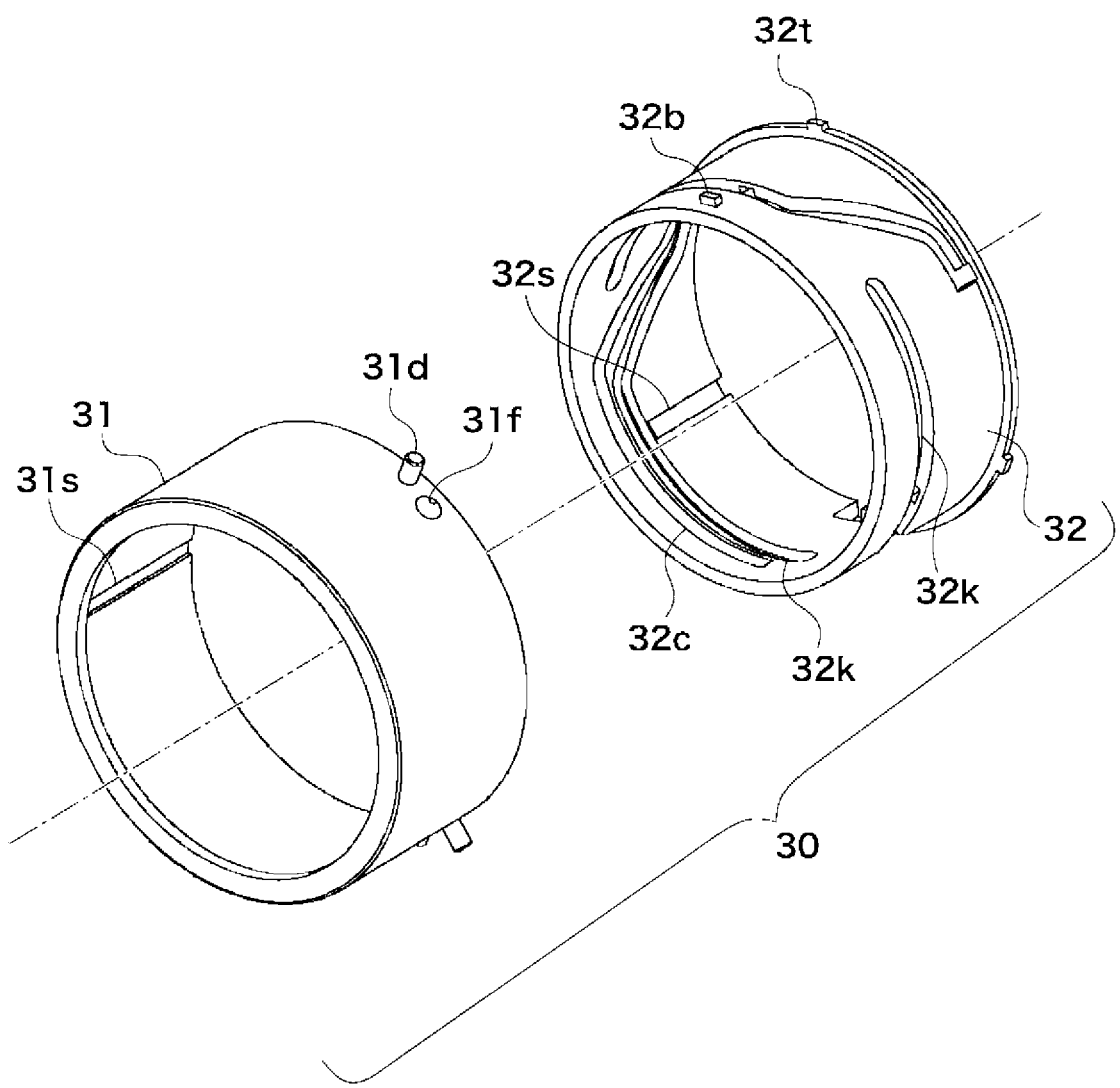
FIG. 7 is an exploded perspective view of a first intermediate barrel unit of the lens barrel shown.

FIG. 7 is an exploded perspective view of a first intermediate barrel unit 30 of the lens barrel shown in FIG. 4.

The first intermediate barrel unit 30 as a first stage of the lens barrel is comprised of a first intermediate rotary barrel 31 and a first intermediate rectilinear motion barrel 32.

The first intermediate rectilinear motion barrel 32 functions as a first rectilinear motion barrel restrained from rotation about the optical axis. The first intermediate rotary barrel 31 functions as a first rotary barrel that rotates in a state fitted on the first rectilinear motion barrel.

Further, the first intermediate rectilinear motion barrel 32 functions as a movable rectilinear motion barrel that is linearly guided by the fixed barrel 23 for motion along the optical axis. In this case, the first intermediate rotary barrel 31 functions as a movable rotary barrel that is fitted on the movable rectilinear motion barrel and is movable along the optical axis.

The first intermediate rectilinear motion barrel 32 has a projection 32b for engagement with a groove portion 31b (see FIG. 1) formed circumferentially on the inner periphery of the first intermediate rotary barrel 31, so that the intermediate rectilinear motion barrel 32 moves along the optical axis in unison with the first intermediate rotary barrel 31.

The first intermediate rectilinear motion barrel 32 has straight advance grooves 32s, through grooves 32k, and cam grooves 32c formed in an inner periphery (inner peripheral surface) thereof, and rectilinear slide key portions 32t projecting from an outer periphery thereof. The first intermediate rectilinear motion barrel 32 has the rectilinear slide key portions 32t for engagement with the respective straight advance grooves 23s in the fixed barrel 23, so that the first intermediate rectilinear motion barrel 32 is rectilinearly guided. It should be noted that the each groove 32k is substantially identical in track to each cam groove 32c.

The first intermediate rotary barrel 31 has drive pins 31d and cam pins 31f projecting from an outer periphery thereof and straight advance grooves 31s formed in an inner peripheral surface thereof. The drive pins 31d are engaged with the respective straight advance grooves 22s on the rotary barrel 22 through the respective through grooves 32k, so that the first intermediate rotary barrel 31 performs rotation along with the rotary barrel 22. The cam pins 31f are engaged with the respective cam grooves 23c on the fixed barrel 23, so that the first intermediate barrel unit 30 moves in the optical axis direction following the respective tracks of the cam grooves 23c.

Figure 8:
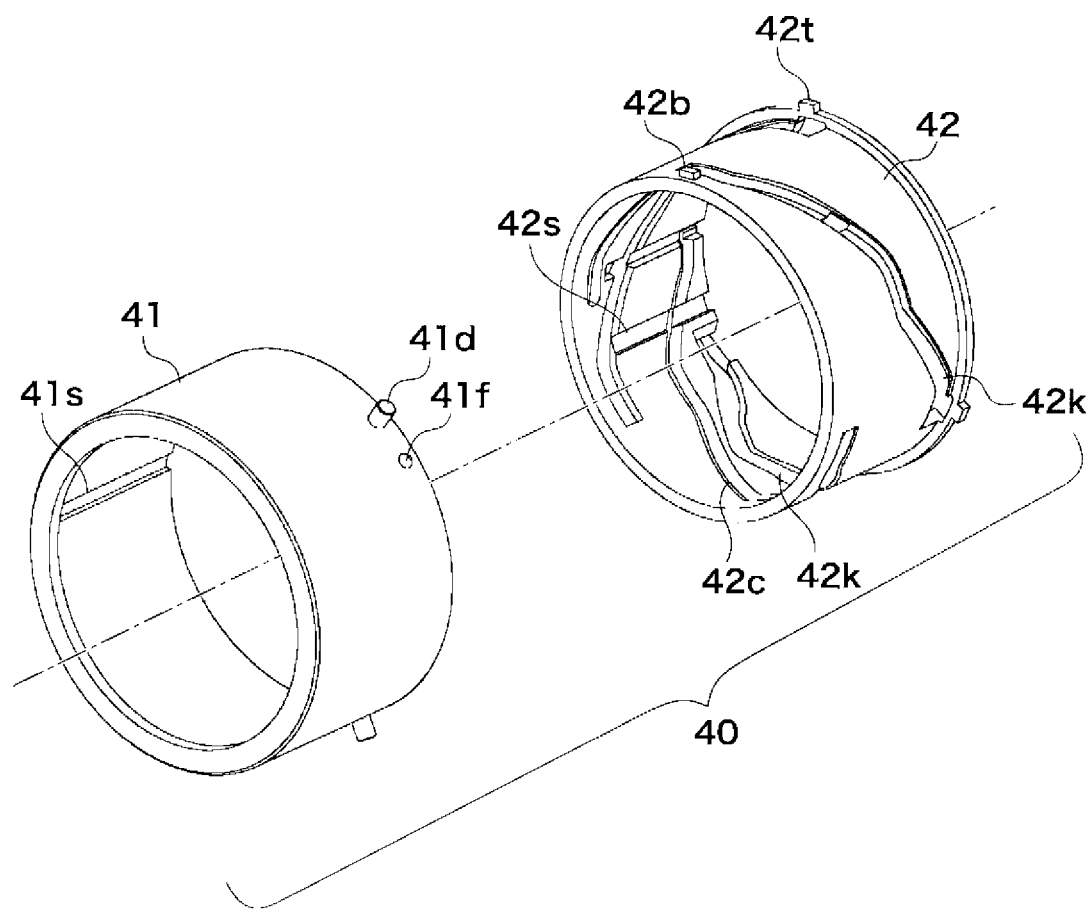
FIG. 8 is an exploded perspective view of a second intermediate barrel unit of the lens barrel shown.

FIG. 8 is an exploded perspective view of a second intermediate barrel unit 40 of the lens barrel shown in FIG. 4.

The second intermediate barrel unit 40 as a second stage of the lens barrel is identical in construction to the first intermediate barrel unit 30, and is comprised of a second intermediate rotary barrel (rotary member) 41 and a second intermediate rectilinear motion barrel (rectilinearly moving member) 42.

The second intermediate rectilinear motion barrel 42 functions as a second rectilinear motion barrel rectilinearly guided by the first rectilinear motion barrel. The second intermediate rotary barrel 41 functions as a second rotary barrel which rotates in a state fitted on the second rectilinear motion barrel and engaged with the first rotary barrel.

The second intermediate rectilinear motion barrel 42 has a projection 42b for engagement with a groove portion 41b (see FIG. 1) formed circumferentially on the inner periphery of the second intermediate rotary barrel 41, so that the intermediate rectilinear motion barrel 42 moves along the optical axis in unison with the second intermediate rotary barrel 41.

The second intermediate rectilinear motion barrel 42 has straight advance grooves 42s, through grooves 42k, and cam grooves 42c formed on an inner peripheral surface thereof, and rectilinear slide key portions 42t projecting from an outer periphery thereof. The second intermediate rectilinear motion barrel 42 has the rectilinear slide key portions 42t for engagement with the straight advance grooves 32s on the first intermediate rectilinear motion barrel 32, so that the second intermediate rectilinear motion barrel 42 is rectilinearly guided.

The second intermediate rotary barrel 41 has drive pins 41d and cam pins 41f projecting from an outer periphery thereof and straight advance grooves 41s formed on an inner peripheral surface thereof. The drive pins 41d are engaged with the respective straight advance grooves 31s on the first intermediate rotary barrel 31 through the respective through grooves 32k, so that the second intermediate rotary barrel 41 performs rotation along with the first intermediate rotary barrel 31. The cam pins 41f are engaged with the respective cam grooves 32c on the first intermediate rectilinear motion barrel 32, so that the second intermediate barrel unit 40 moves in the optical axis direction following the respective tracks of the cam grooves 32c.

Figure 9:
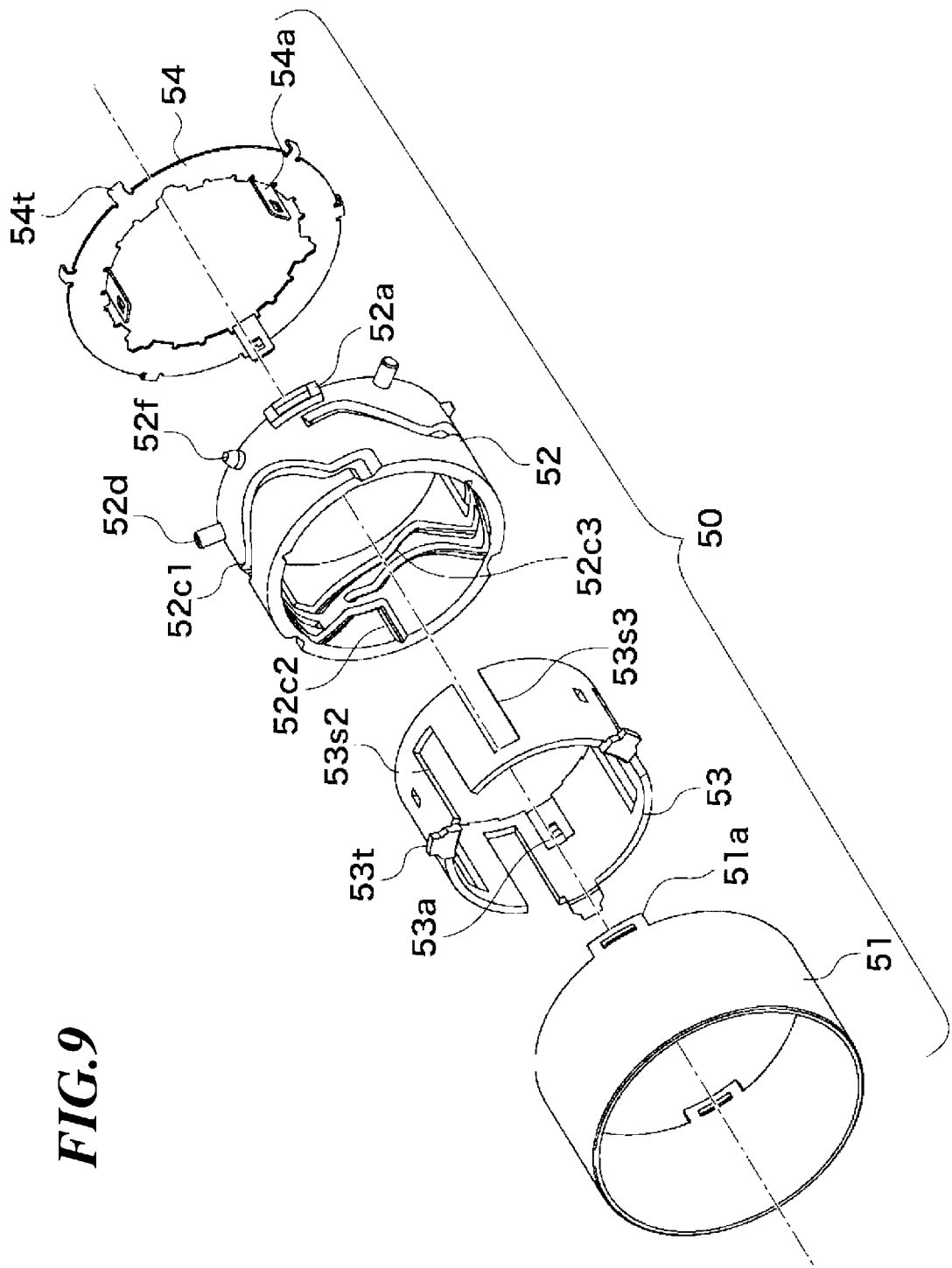
FIG. 9 is an exploded perspective view of a cam barrel unit of the lens barrel.

FIG. 9 is an exploded perspective view of a cam barrel unit of the lens barrel shown in FIG. 4.

The cam barrel unit 50 as a third stage of the lens barrel is comprised of a third intermediate rotary barrel 51, a cam barrel 52, an inner rectilinear motion barrel 53, and an inner rectilinearly moving plate 54.

The inner rectilinear motion barrel 53 has an inner peripheral surface thereof formed with projections 53a, a straight advance groove 53s2 for rectilinearly guiding the second group holder 72 (see FIG. 4), and a straight advance groove 53s3 for rectilinearly guiding the third group holder 73 (see FIG. 4), and an outer periphery thereof formed with rectilinear slide key portions 53t for rectilinearly guiding a first group barrel unit 60 (see FIG. 4). The inner rectilinearly moving plate 54 has an inner periphery thereof formed with projections 54a and an outer periphery thereof formed with rectilinear slide key portions 54t.

The inner rectilinear motion barrel 53 is fitted in the cam barrel 52 from the front thereof, and the inner rectilinearly moving plate 54 is fitted into the cam barrel 52 from the rear thereof, such that the cam barrel 52 is sandwiched by the inner rectilinear motion barrel 53 and the inner rectilinearly moving plate 54. The projections 53a of the inner rectilinear motion barrel 53 are engaged with the respective associated projections 54a of the inner rectilinearly moving plate 54, whereby the inner rectilinear motion barrel 53 and the inner rectilinearly moving plate 54 are secured in a state sandwiching the cam barrel 52 therebetween and rectilinearly guided.

The inner rectilinearly moving plate 54 is rectilinearly guided by engagement between the rectilinear slide key portions 54t and the respective associated straight advance grooves 42s of the second intermediate rectilinear motion barrel 42. The inner rectilinearly moving plate 54 is rectilinearly guided, whereby the inner rectilinear motion barrel 53 is also rectilinearly guided.

Further, the cam barrel 52 has drive pins 52d and cam pins 52f projecting from an outer periphery thereof. The drive pins 52d are engaged with the respective straight advance grooves 41s of the second intermediate rotary barrel 41 through the respective through grooves 42k, whereby the cam barrel 52 rotates in unison with the second intermediate rotary barrel 41. The cam pins 52f are engaged with the respective cam grooves 42c of the second intermediate rectilinear motion barrel 42, whereby the cam barrel unit 50 is moved along the optical axis following the respective tracks of the cam grooves 42c.

The third intermediate rotary barrel 51 and the cam barrel 52 rotate in unison by engagement between engagement portions 51a of the third intermediate rotary barrel 51 and projections 52a of the can cylinder 52.

Further, the cam barrel 52 has a cam 52c1 formed on the outer peripheral surface thereof for controlling the distance of travel of the first group barrel unit 60, and cams 52c2 and 52c3 formed on an inner peripheral surface thereof for controlling the distance of travel of the second group holder 72 and that of a third group holder 73, respectively.

The first group barrel unit 60 appearing in FIG. 4 is comprised of the first group barrel 61, a first group cover 62, and barrier blades 63 as shown in FIG. 1. The first group barrel 61 has a straight advance groove 61s formed on an inner peripheral surface thereof for engagement with the rectilinear slide key portions 53t of the inner rectilinear motion barrel 53, so that the first group barrel unit 60 is rectilinearly guided.

Further, the first group barrel 61 has a cam pin 61f for engagement with the cam 52c1 of the cam barrel 52. Therefore, the first group barrel unit 60 moves in the optical axis direction following the tracks of the cam 52c1. The barrier blades 63 are operated by a drive means, not shown, for being opened for the use of the lens barrel, and closed when the lens barrel is restracted.

As described above, in the lens barrel (lens barrel unit) 2 in the present embodiment, the rotary barrel 22 is rotated by the driving force of the motor 81, whereby the first intermediate rotary barrel 31, the second intermediate rotary barrel 41, the cam barrel 52, and the third intermediate rotary barrel 51 in engagement with the rotary barrel 22 are rotated in unison.

Further, the fixed barrel 23 and the first intermediate rectilinear motion barrel 32, the second intermediate rectilinear motion barrel 42, the inner rectilinearly moving plate 54, and the inner rectilinear motion barrel 53 in engagement with the fixed barrel 23 are rectilinearly guided, whereby the first group barrel unit 60, the second group holder 72, and the third group holder 73 are rectilinearly guided.

The lens barrel comprised of the above-described components is mounted to an image pickup apparatus. FIG. 5 shows the image pickup apparatus equipped with the four-stage retractable lens barrel 2.

Figure 10:
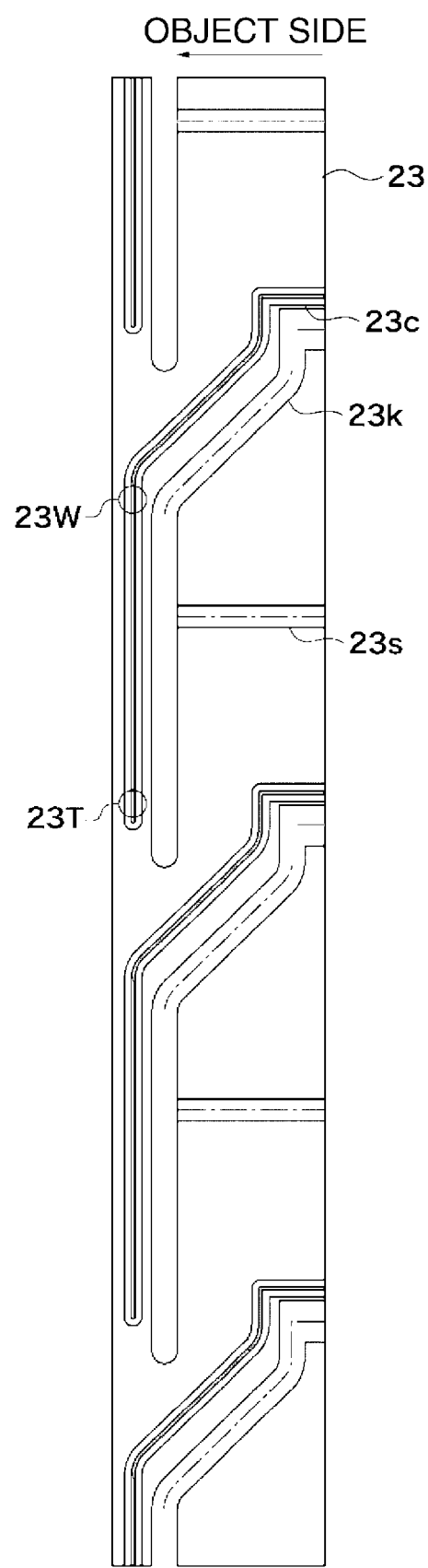
FIG. 10 is an unfolded view showing the inner peripheral surface of the fixed barrel appearing in FIG. 6.
Figure 11:
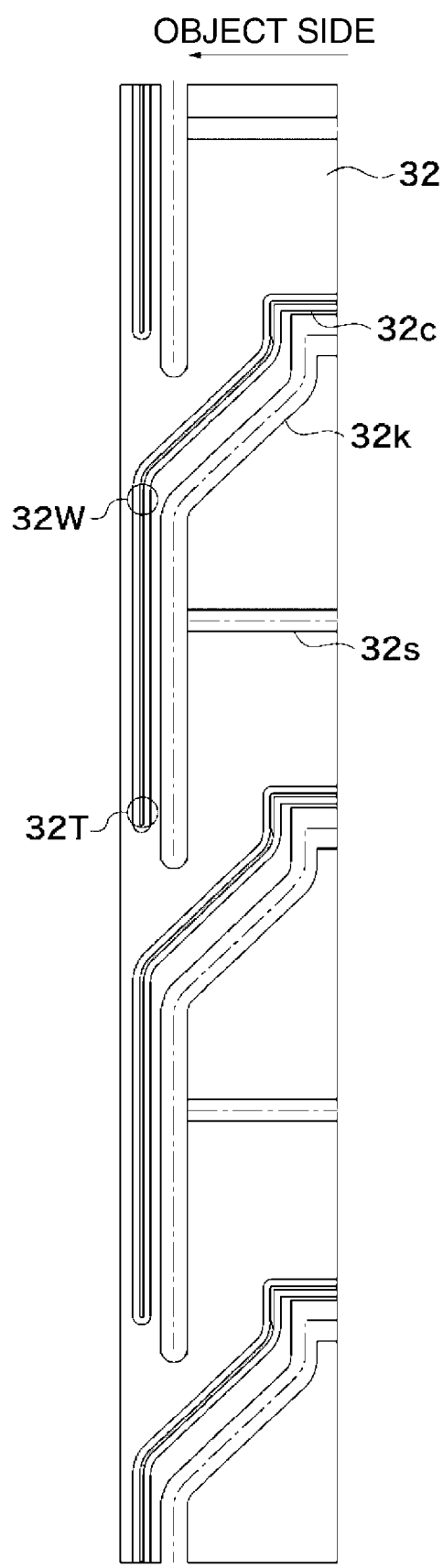
FIG. 11 is an unfolded view showing the inner peripheral surface of a first intermediate rectilinear motion barrel appearing in FIG. 7.
Figure 12:
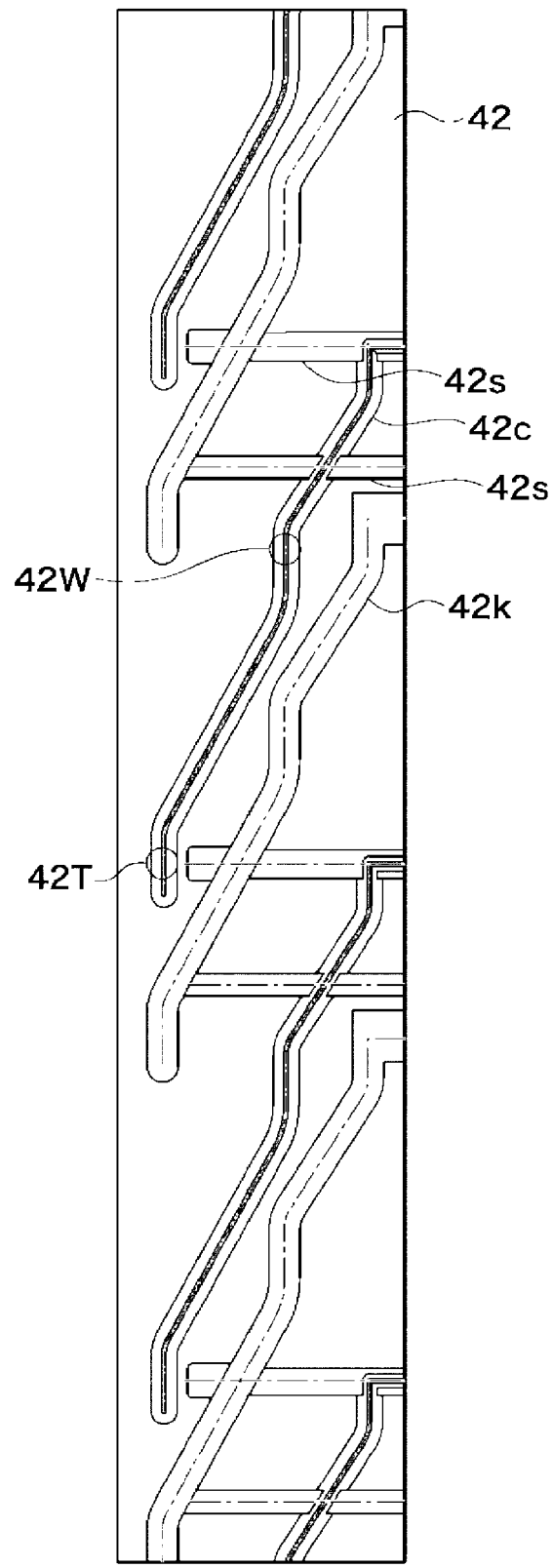
FIG. 12 is an unfolded view showing the inner peripheral surface of a second intermediate rectilinear motion barrel appearing in FIG. 8.
Figure 13:
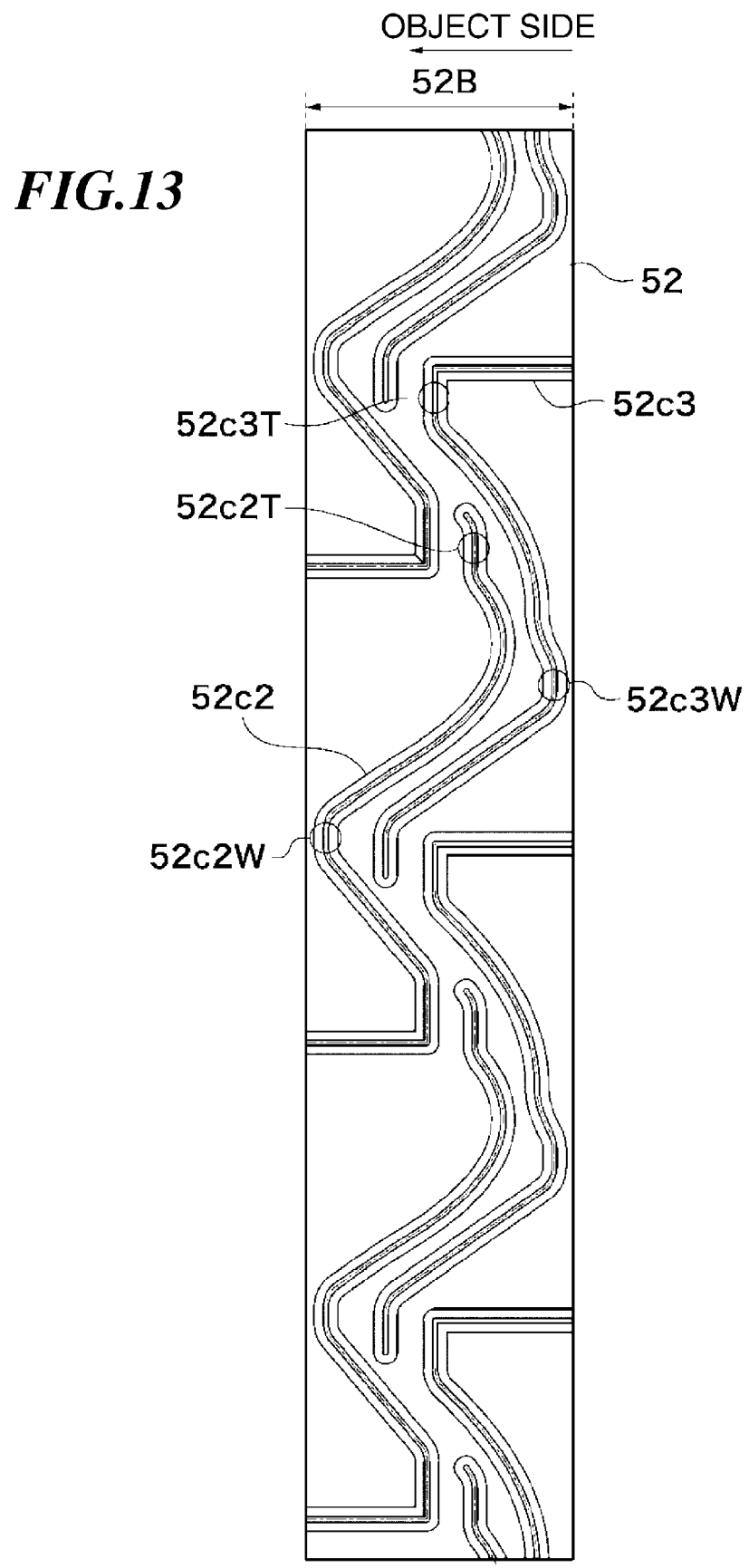
FIG. 13 is an unfolded view showing the inner peripheral surface of a cam barrel appearing in FIG. 9.

FIG. 10 is an unfolded view showing the inner peripheral surface of the fixed barrel appearing in FIG. 6. FIG. 11 is an unfolded view showing the inner peripheral surface of the first intermediate rectilinear motion barrel appearing in FIG. 7. FIG. 12 is an unfolded view showing the inner peripheral surface of the second intermediate rectilinear motion barrel appearing in FIG. 8. Further, FIG. 13 is an unfolded view showing the inner peripheral surface of the cam barrel appearing in FIG. 9. In each of the figures, only essential parts are shown.

As shown in FIG. 10, the fixed barrel 23 has the inner peripheral surface formed with the straight advance grooves 23s, the through grooves 23k, and the cam grooves 23c. The through grooves 23k and the associated cam grooves 23c are identical in track, and each through groove 23k is a through groove for engagement between the associated drive pin 31d of the first intermediate rotary barrel 31 and the associated straight advance groove 22s of the rotary barrel 22.

The cam groove 23c is engaged with the associated cam pin 31f of the first intermediate rotary barrel 31. The cam pin 31f is shifted to a position 23W when the lens barrel enters the wide-angle state, while when the lens barrel enters the telephoto state, the cam pin 31f is shifted to a position 23T.

As shown in FIG. 11, the first intermediate rectilinear motion barrel 32 has the inner peripheral surface thereof formed with the straight advance grooves 32s, the through grooves 32k, and the cam grooves 32c. The through grooves 32k and the associated cam grooves 32c are identical in track, and each through groove 32k is a through groove for engagement between the associated drive pin 41d of the second intermediate rotary barrel 41 and the associated straight advance groove 31s of the first intermediate rotary barrel 31.

The cam groove 32c is engaged with the associated cam pin 41f of the second intermediate rotary barrel 41. The cam pin 41f is shifted to a position 32W when the lens barrel enters the wide-angle state, while when the lens barrel enters the telephoto state, the cam pin 41f is shifted to a position 32T.

Although in the present embodiment, the inner cam grooves of the fixed barrel 23 and those of the first intermediate rectilinear motion barrel 32 are formed to have the substantially identical shape, they may be formed to have different shapes insofar as the relationship between a cam groove, a through groove, and a straight advance groove can be satisfied.

As shown in FIG. 12, the second intermediate rectilinear motion barrel 42 has the inner peripheral surface thereof formed with the straight advance grooves 42s, the through grooves 42k, and the cam grooves 42c. The through grooves 42k and the associated cam grooves 42c are identical in track, and each through groove 42k is for engagement between the associated drive pin 52d of the cam barrel 52 and the associated straight advance groove 41s of the second intermediate rotary barrel 41.

The cam groove 42c is engaged with the associated cam pin 52f of the cam barrel 52. The cam pin 52f is shifted to a position 42W when the lens barrel enters the wide-angle state, while when the lens barrel enters the telephoto state, the cam pin 52f is shifted to a position 42T. The second intermediate rectilinear motion barrel 42 is configured to always guide the inner rectilinearly moving plate 54 rectilinearly by the six straight advance grooves 42s.

As shown in FIG. 13, the cam barrel 52 has the inner peripheral surface thereof formed with the cam 52c2 for controlling the distance of travel of the second group holder 72 and the cam 52c3 for controlling the distance of travel of the third group holder 73. The cam 52c2 is engaged with a cam pin 72f (see FIG. 1) of the second group holder 72.

On the other hand, the cam 52c3 is engaged with a cam pin 73f (see FIG. 1) of the third group holder 73. The cam pins 72f and 73f are shifted to respective positions 52c2W and 52c3W when the lens barrel enters the wide-angle state, while when the lens barrel enters the telephoto state, the cam pins 72f and 73f are shifted to respective positions 52c2T and 52c3T.

Since the cam barrel 52 is disposed, as described hereinbefore, in a manner sandwiched in the optical axis direction between the inner rectilinear motion barrel 53 and the inner rectilinearly moving plate 54 disposed radially inward of the cam barrel 52, for serving as a rectilinearly moving guide for guiding the lens group, the inner rectilinear motion barrel 53 and the inner rectilinearly moving plate (rectilinearly moving member) 54 are moved in unison as the cam barrel moves along the optical axis.

For this reason, the cam barrel 52 is not required to have a bayonet connection structure which is employed for connection between the first intermediate rotary barrel 31 and the first intermediate rectilinear motion barrel 32. Therefore, as shown in FIG. 13, the cams can be arranged on the inner peripheral surface of the cam barrel 52 such that a length 52B of the cam barrel 52 in the optical axis direction is minimized.

Although in the present embodiment, the cam grooves and the through grooves are shaped as shown in FIGS. 10 to 13, this is not limitative, but they can be shaped as desired insofar as the relationship between each cam groove, each through groove, and each straight advance groove can be satisfied.

Further, in the present embodiment, the two intermediate barrel units (the first intermediate barrel unit 30 and the second intermediate barrel unit 40) are arranged to form the four-stage retractable lens barrel, but this is not limitative. For example, if only one intermediate barrel unit is used, it is possible to form a three-stage retractable lens barrel.

Further, if three intermediate barrel units are used, it is possible to form a five-stage retractable lens barrel. By thus changing the number of intermediate barrel units, the number of stages of a lens barrel can be changed as desired.

In the following, a description will be given of a second embodiment of the present invention.

Figure 14:
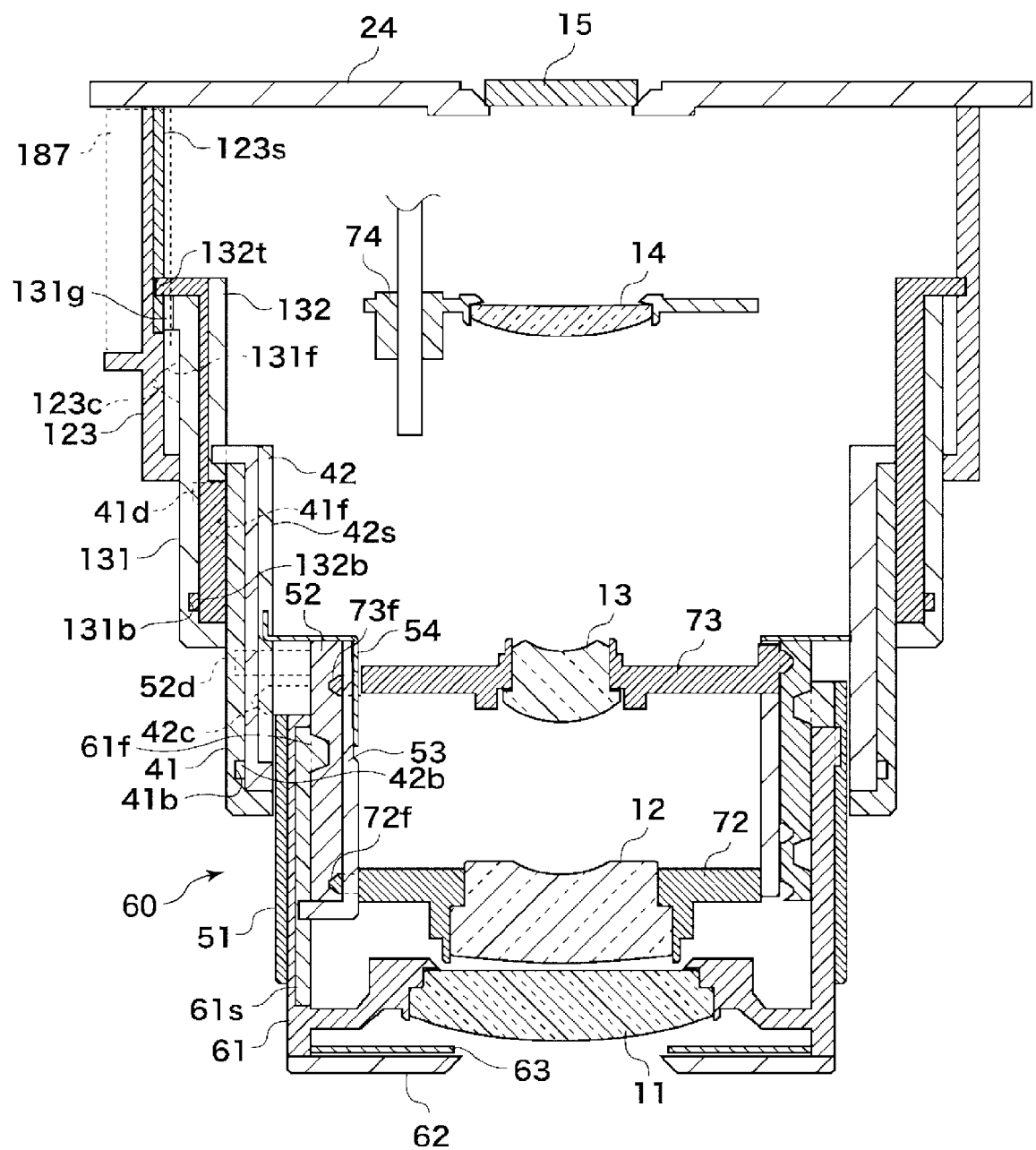
FIG. 14 is a view of a lens barrel of an image pickup apparatus according to a second embodiment of the present invention, which is in the wide-angle state when the image pickup apparatus is in the shooting mode.
Figure 15:
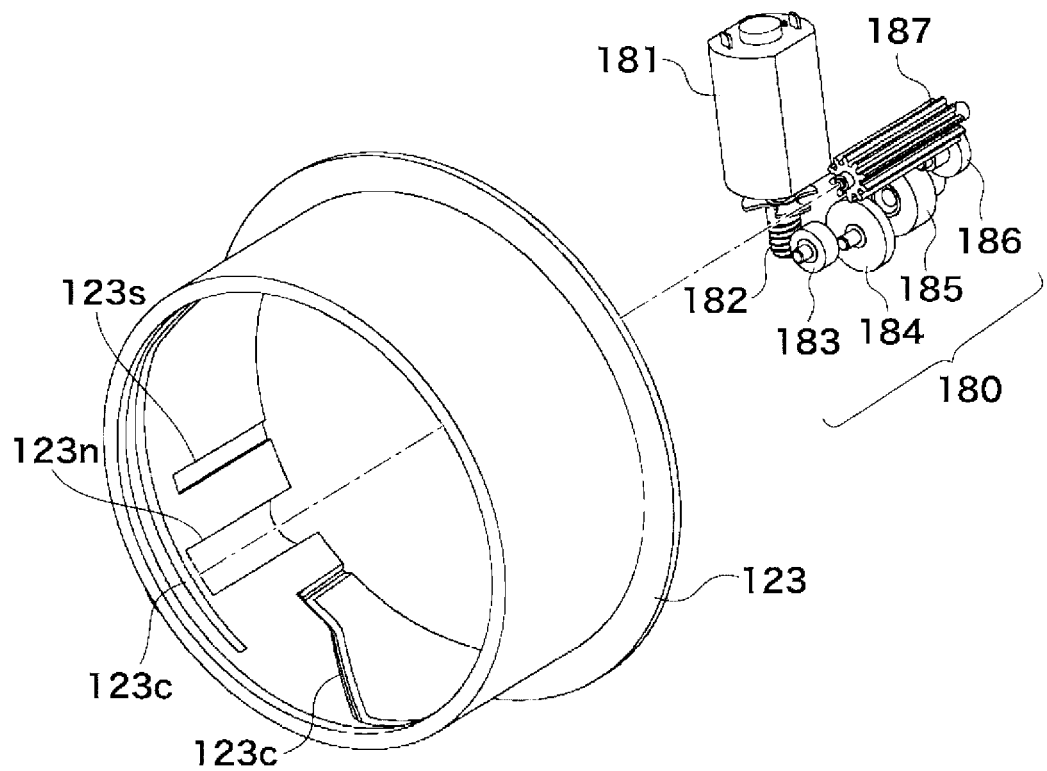
FIG. 15 is an exploded perspective view of a fixed barrel and a gear unit of the lens barrel.
Figure 16:
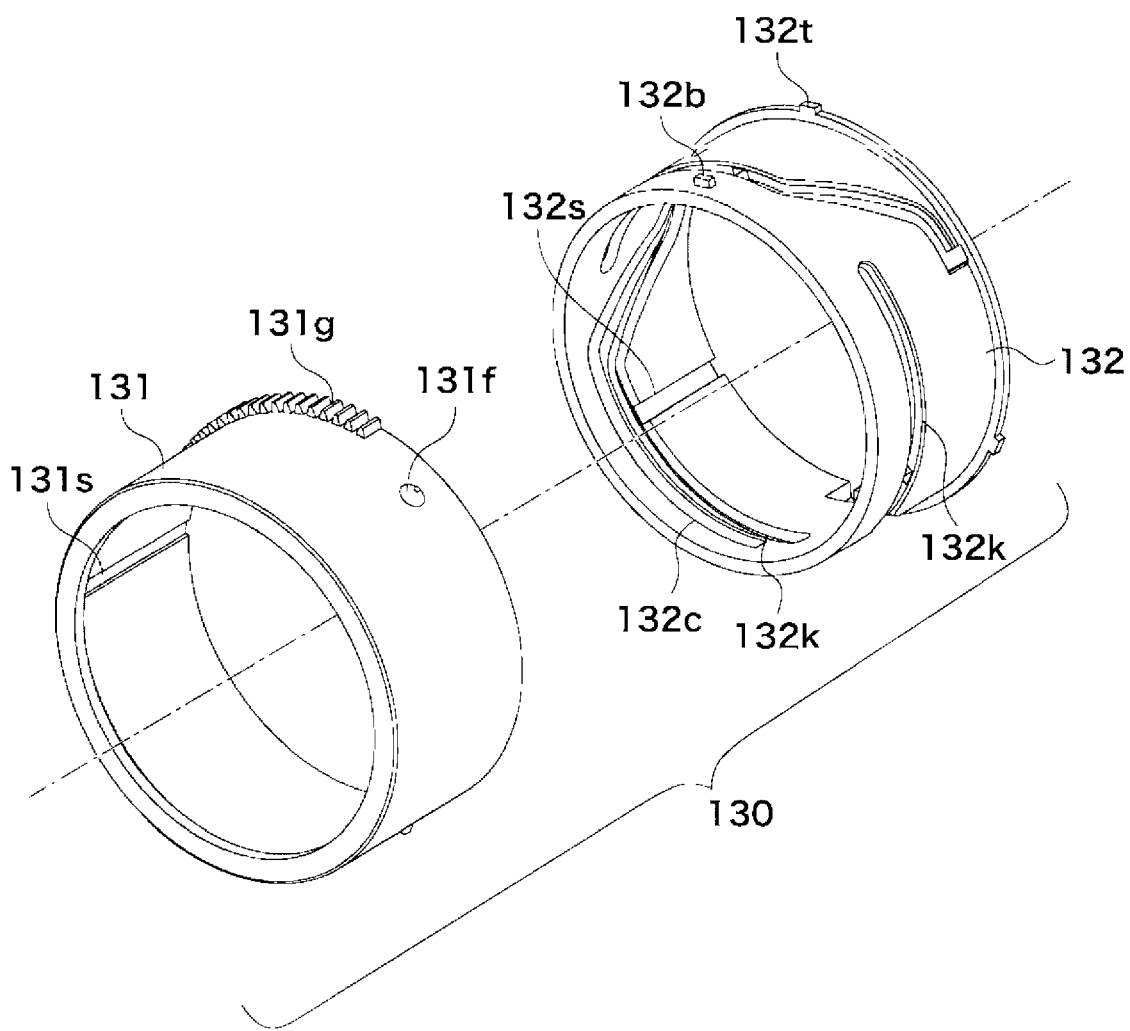
FIG. 16 is an exploded perspective view of a first intermediate barrel unit of the lens barrel.

FIG. 14 is a view of a lens barrel of an image pickup apparatus according to the second embodiment, which is in the wide-angle state when the image pickup apparatus is in the shooting mode. FIG. 15 is an exploded perspective view of a fixed barrel and a gear unit of the lens barrel, and FIG. 16 is an exploded perspective view of a first intermediate barrel unit of the lens barrel.

In the present embodiment, a photographic lens group (a first group lens 11 to a fourth group lens 14), a second intermediate barrel unit 40, a cam barrel unit 50, and a first group barrel unit 60 have the same construction as in the first embodiment.

Now, a description will be given of each stage of the lens barrel.

Referring to FIG. 15, the fixed barrel 123 is secured to the camera body 1 e.g. with screws, together with the holder 24 for holding the image pickup element 15, and is held thereat.

In the present embodiment, a zoom gear unit 180 is comprised of a motor 181 as a drive source, gears 182 to 186 for transmitting a driving force from the motor 181, and a long gear 187, and the long gear 187 is held by a gear holding part 123n of the fixed barrel 123. Further, the fixed barrel 123 has an inner peripheral surface thereof formed with straight advance grooves 123s and cam grooves 123c.

As shown in FIG. 16, a first intermediate barrel unit 130 as a first stage of the lens barrel is comprised of a first intermediate rotary barrel 131 and a first intermediate rectilinear motion barrel 132. The first intermediate rectilinear motion barrel 132 has a projection 132b projecting therefrom for engagement with a groove portion 131b (see FIG. 14) formed circumferentially on the inner periphery of the first intermediate rotary barrel 131, so that the first intermediate rectilinear motion barrel 132 moves along the optical axis in unison with the first intermediate rotary barrel 131.

The first intermediate rectilinear motion barrel 132 has straight advance grooves 132s, through grooves 132k, and cam grooves 132c formed on an inner peripheral surface thereof, and rectilinear slide key portions 132t projecting from an outer periphery thereof, as in the first embodiment. The first intermediate rectilinear motion barrel 132 has the rectilinear slide key portions 132t for engagement with the straight advance grooves 123s on the fixed barrel 123, so that the first intermediate rectilinear motion barrel 132 is rectilinearly guided.

The first intermediate rotary barrel 131 has a drive gear 131g and cam pins 131f projecting from an outer peripheral surface thereof and straight advance grooves 131s formed on an inner peripheral surface thereof. The drive gear 131g is engaged with the long gear 187, and hence the first intermediate rotary barrel 131 performs rotation. The cam pins 131f are engaged with the respective cam grooves 123c on the fixed barrel 123, so that the first intermediate barrel unit 130 moves in the optical axis direction following the respective tracks of the cam grooves 123c.

The second intermediate barrel unit 40 as a second stage of the lens barrel, the cam barrel unit 50 as a third stage of the lens barrel, and the first group barrel unit 60 have the same construction as in the first embodiment.

Figure 17:
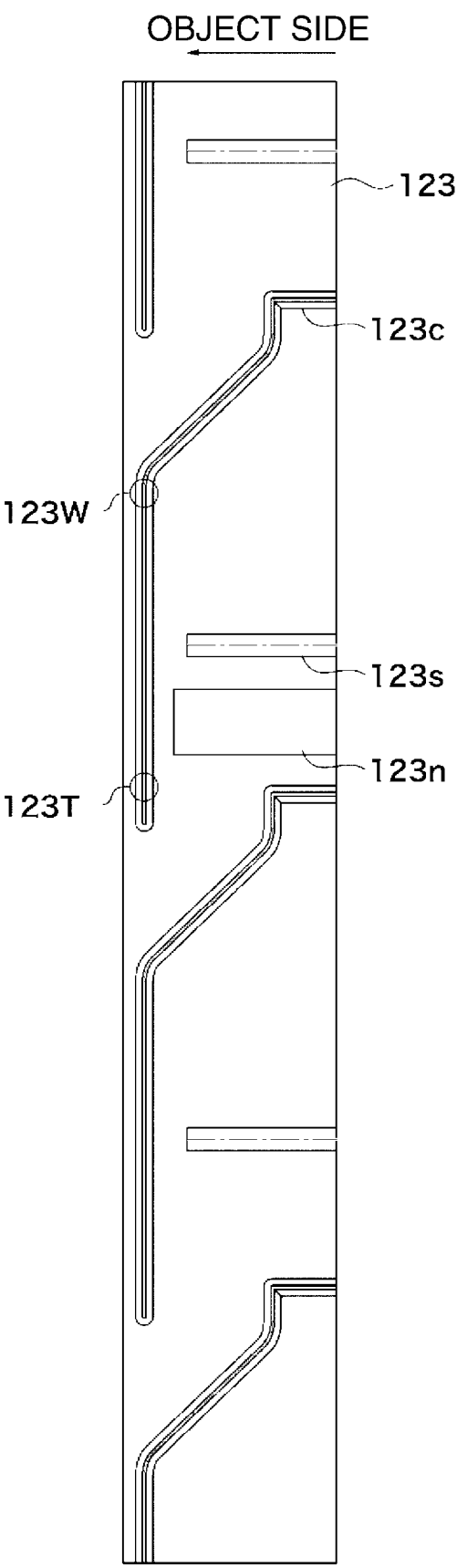
FIG. 17 is an unfolded view showing the inner peripheral surface of the fixed barrel appearing in FIG. 15.
Figure 18:
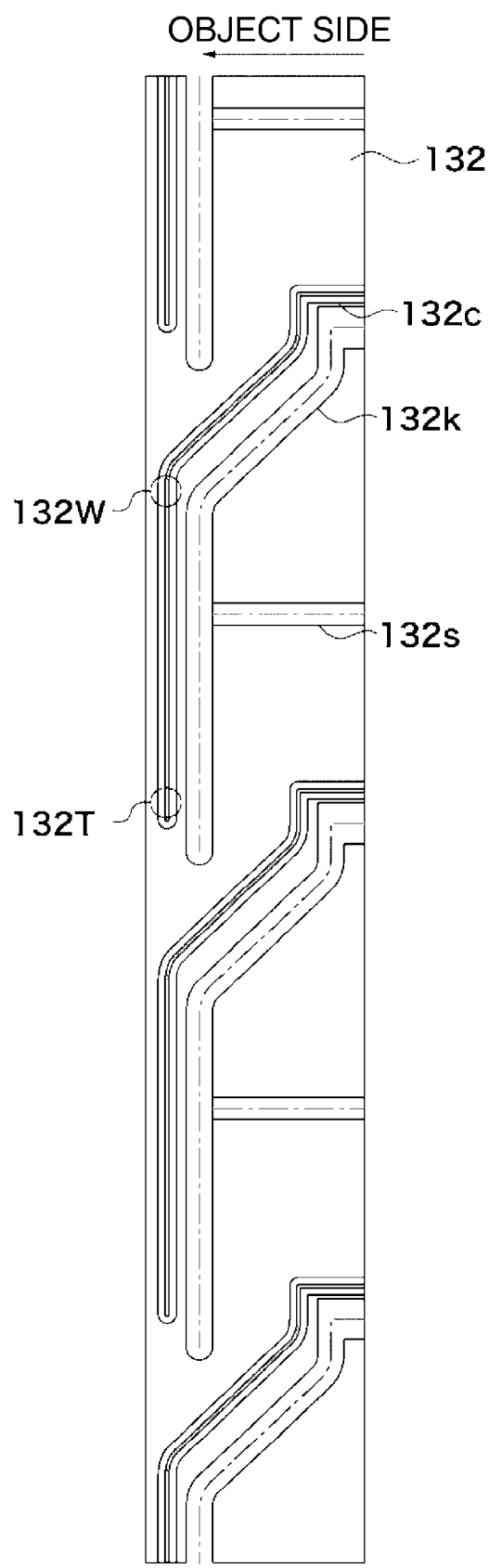
FIG. 18 is an unfolded view showing the inner peripheral surface of a first intermediate rectilinear motion barrel appearing in FIG. 16.

FIG. 17 is an unfolded view showing the inner peripheral surface of the fixed barrel appearing in FIG. 15, and FIG. 18 is an unfolded view showing the inner peripheral surface of the first intermediate rectilinear motion barrel appearing in FIG. 16. In each of the figures, only essential parts are shown.

As shown in FIG. 17, the fixed barrel 123 has the inner peripheral surface thereof formed with the straight advance grooves 123s, the cam grooves 123c, and the gear holding part 123n. The cam groove 123c is engaged with the associated cam pin 131f of the first intermediate rotary barrel 131. The cam pin 131f is shifted to a position 123W when the lens barrel enters the wide-angle state, while when the lens barrel enters the telephoto state, the cam pin 131f is shifted to a position 123T.

As shown in FIG. 18, the first intermediate rectilinear motion barrel 132 has the inner peripheral surface thereof formed with the straight advance grooves 132s, the through grooves 132k, and the cam grooves 132c. Each through groove 132k is for engagement between the associated drive pin 41d of the second intermediate rotary barrel 41 and the associated straight advance groove 131s of the first intermediate rotary barrel 131.

The cam groove 132c is engaged with the associated cam pin 41f of the second intermediate rotary barrel 41. The cam pin 41f is shifted to a position 132W when the lens barrel enters the wide-angle state, while when the lens barrel enters the telephoto state, the cam pin 41f is shifted to a position 132T.

Although in the present embodiment, the inner cam grooves of the fixed barrel 123 and those of the first intermediate rectilinear motion barrel 132 are formed to have respective shapes substantially identical in track, they may be configured differently insofar as the relationship between each cam groove, each through groove, and each straight advance groove can be satisfied. Further, the cam grooves may be configured to formed on side walls of through grooves.

Further, in the present embodiment as well as in the first embodiment, the two intermediate barrel units are arranged so as to form the four-stage retractable lens barrel, but this is not limitative. For example, if only one intermediate barrel unit is used, it is possible to form a three-stage retractable lens barrel.

Further, if three intermediate barrel units are arranged, it is possible to form a five-stage retractable lens barrel. By thus changing the number of intermediate barrel units, the number of stages of a lens barrel can be changed as desired.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-203183 filed Aug. 6, 2008, which is hereby incorporated by reference herein in its entirety.

What is claimed is:

1. An image pickup apparatus comprising:
a plurality of lens holding units configured to hold a plurality of lens groups respectively;
a rotary barrel, having a gear formed circumferentially thereon, configured to rotate about an optical axis circumferentially, the gear transmitting a driving source from a motor;
a fixed barrel configured to be held in the image pickup apparatus together with a holder for holding an image pickup element, so as to be restrained from rotation about the optical axis, wherein said fixed barrel is disposed inside said rotary barrel;
a first rotary barrel configured to be engaged with said rotary barrel, for rotation, wherein said first rotary barrel is disposed inside said fixed barrel;
a first rectilinear motion barrel configured to be engaged with said first rotary barrel so that said first rectilinear motion barrel can move along the optical axis in unison with said first rotary barrel, wherein said first rectilinear motion barrel is rectilinearly guided by said fixed barrel and wherein said first rectilinear motion barrel is disposed inside said first rotary barrel;
a second rotary barrel configured to be engaged with said first rotary barrel, for rotation, wherein said second rotary barrel is disposed inside said first rectilinear motion barrel, and
a second rectilinear motion barrel configured to be engaged with said second rotary barrel so that said second rectilinear motion barrel can move along the optical axis in unison with said second rotary barrel, wherein said second rectilinear motion barrel is rectilinearly guided by said first rectilinear motion barrel and wherein said second rectilinear motion barrel is disposed inside said second rotary barrel,
a cam barrel unit configured to be engaged with said second rotary barrel so that said cam barrel unit can move along the optical axis in unison with said second rotary barrel, wherein said cam barrel unit is rectilinearly guided by said second rectilinear motion barrel and wherein said cam barrel unit is disposed inside said second rectilinear motion barrel and includes a cam barrel and a third rectilinear motion barrel disposed inside the cam barrel,
wherein said fixed barrel has a cam groove for causing said first rotary barrel to move along the optical axis,
wherein said first rectilinear motion barrel has a cam groove for causing said second rotary barrel to move along the optical axis,
wherein said second rectilinear motion barrel has a cam groove for causing said cam barrel unit to move along the optical axis,
wherein at least one of said plurality of lens holding units is disposed outside said cam barrel unit and at least other one of said plurality of lens holding units is disposed inside said cam barrel unit;
wherein the cam barrel has a plurality of cam grooves to be engaged with said plurality of lens holding units respectively, at least one of the plurality of cam grooves being disposed inside the cam barrel and at least other one of the plurality of earn grooves being disposed outside the cam barrel; and wherein the third rectilinear motion barrel has a plurality of guide portions for rectilinearly guiding said plurality of lens holding units respectively, at least one of the plurality of guide portions being a projecting portion disposed at an outer periphery of said third rectilinear motion barrel and to be engaged with the at least one of said plurality of lens holding units outside said cam barrel unit.

2. The image pickup apparatus according to claim 1, wherein said first rectilinear motion barrel has a straight advance groove and a through groove formed on the inner peripheral surface thereof, the straight advance groove rectilinearly guiding said second rectilinear motion barrel, and the through groove being substantially identical in track to the earn groove for said first rectilinear motion barrel, and wherein said first rotary barrel has a straight advance groove formed on an inner peripheral surface thereof, for engagement with an engagement portion of said second rotary barrel.

3. The image pickup apparatus according to claim 1, wherein at least other one of said plurality of guide portions is a through hole provided with said third rectilinear motion barrel, and the at least other one of said plurality of lens holding units inside said cam barrel unit is configured to be engaged with the cam barrel via the through hole.

4. The image pickup apparatus according to claim 1, wherein said cam barrel unit further comprises a hollow-centered circular plate wherein the cam barrel is sandwiched in the optical axis direction between the hollow-centered circular plate and the third rectilinear motion barrel.

5. The image pickup apparatus according to claim 1, wherein the cam groove of said second rectilinear motion barrel is configured to be engaged with a drive pin disposed at an outer periphery of the cam barrel, and said second rectilinear motion barrel further has a through groove substantially identical in track to the cam groove of said second rectilinear motion barrel, and wherein the through groove of said second rectilinear motion barrel is for engagement between the drive pin of the cam barrel and a straight advance groove of said second rotary barrel so that the cam barrel performs rotation along with said second rotary barrel.

6. The image pickup apparatus according to claim 1, wherein said second rotary barrel and the cam barrel move along the optical axis in unison with each other.

* * * * *